United States Patent [19]

Hata et al.

[11] Patent Number: 4,951,871
[45] Date of Patent: Aug. 28, 1990

[54] SOUND-PROOF TYPE ENGINE WORKING MACHINE WITH WASTE HEAT RECOVERY APPARATUS

[75] Inventors: Tsugunori Hata; Akira Inoue; Toshihiko Teramoto; Kazuhiko Ogura; Isamu Kubomoto, all of Osaka, Japan

[73] Assignee: Kubota Ltd., Osaka, Japan

[21] Appl. No.: 335,404

[22] Filed: Apr. 10, 1989

[30] Foreign Application Priority Data

Oct. 4, 1988 [JP] Japan ................................ 63-250668
Oct. 12, 1988 [JP] Japan ................................ 63-258161

[51] Int. Cl.[5] ............................................ G05D 23/00
[52] U.S. Cl. .............................. 237/12.1; 237/12.3 A; 237/12.3 B
[58] Field of Search ............... 237/12.1, 2 B, 12.3 A, 237/12.3 B; 62/323.1, 324.1, 238.6; 165/47; 126/104 A

[56] References Cited

U.S. PATENT DOCUMENTS 2,200,214  5/1940  Carter .................................. 237/12.1
4,293,092 10/1981  Hatz et al. .......................... 237/12.1
4,691,687  9/1987  Mutchlen ............................ 237/12.1
4,735,061  4/1988  Hsieh ................................. 237/2 B X

FOREIGN PATENT DOCUMENTS 63-205412  8/1988  Japan .................................. 237/12.1

Primary Examiner—Henry A. Bennet
Attorney, Agent, or Firm—Lowe, Price, LeBlanc, Becker & Shur

[57] ABSTRACT

In a sound-proof type engine working machine with a waste heat recovery apparatus, including a sound-proof type engine working machine which comprises a liquid cooled internal combustion engine and a working machine such as an electricity generator, a compressor and the like adapted to be driven by the engine and a waste heat recovery apparatus adapted to recover the waste heat from the engine, the engine cooling liquid within the water jacket of the engine is adapted to circulate through a waste heat recovery heat exchanger and a radiator, as well as the heat to be radiated in the radiator is adapted to be controlled by means of a radiated heat control device, and the engine and the working machine are horizontally arranged side by side each other within the sound-proof casing in a longitudinal direction thereof, an upper support frame is fixed on the upper side of the sound-proof casing, and the radiator and a radiator fan associated therewith are disposed on the upper support frame.

10 Claims, 5 Drawing Sheets

SOUND-PROOF TYPE ENGINE WORKING MACHINE WITH WASTE HEAT RECOVERY APPARATUS

BACKGROUND OF THE INVENTION

1. Field of the Invention

The present invention relates to an assembly comprising a sound-proof type engine working machine wherein a working machine such as an electricity generator, a compressor and the like is adapted to be driven by a liquid-cooled internal combustion engine and an apparatus adapted to recover waste heat from the engine and to be mounted onto the working machine; and, more particularly, to a sound-proof type engine working machine with a waste heat recovery apparatus that is adapted to circulate an engine cooling liquid from a water jacket of the engine through a heat exchanger (for waste heat recovery) and a radiator as the quantity of heat radiated from the radiator is adapted to be controlled by a radiated heat control device.

2. Background of the Prior Art

An example of a conventional sound-proof type engine working machine, heretofore disclosed in Japanese Laid Open Patent Publication No. 1988-205412.

The conventional engine working machine is typically equipped with an electricity generator as a working machine so as to provide a cogeneration apparatus and is also equipped with a vertically long sound-proof casing. Within the vertically long sound-proof casing, there are provided the generator and an engine in upward order and there are further provided various accessories for a waste heat recovery apparatus and a control panel on the upper side of the engine.

There are, however, following disadvantages associated with such a conventional engine working machine.

That is, since the engine is disposed on the upper side of the generator, the total height of the engine working machine is inevitably increased by the height of the engine or the generator correspondingly thereto. Therefore, the various accessories and the control panel are disposed at such a height that it takes much trouble for carrying out the maintenance thereof.

SUMMARY OF THE INVENTION

The present invention is directed to solving the above-mentioned problems and has for its object to provide a sound-proof type engine working machine with a waste heat recovery apparatus which can be maintained readily.

For accomplishing the above-mentioned purpose, the present invention is characterized by such a construction as to be described in the following item (A).

(A) An engine and a working machine are arranged side by side horizontally in a longitudinal direction within a sound-proof casing, an upper support frame is fixedly secured on the upper side of the sound-proof casing, and a radiator and a radiator fan associated therewith are disposed on the upper support frame.

According to this construction, the following advantages can be obtained.

Since the engine and the working machine are not arranged in a vertical direction, the total height of the engine working machine becomes lower by the height of the engine or the working machine correspondingly in comparison with the conventional one. Accordingly, the radiator and the radiator fan disposed on the upper support frame are lowered in position so that the maintenance for the accessories of the waste heat recovery apparatus can be carried out readily. In addition, since the radiator and the radiator fan are not arranged laterally around the engine and the working machine, they can be maintained readily from their lateral side.

In this way, since it becomes easier to carry out the maintenance for the accessories of the waste heat recovery apparatus as well as it also becomes easier to carry out the maintenance for the engine and the working machine, the maintenance for the whole of the sound-proof type engine working machine with the waste heat recovery apparatus can be carried out more easily.

When a portion of the construction mentioned in the item (A) is modified, as described in the following items (B) through (G), further following advantages can be obtained.

(B) In the case that an engine cooling liquid circulation pump and a radiated heat control device for the radiator are arranged on the upper support frame, it becomes easier to carry out the maintenance for the engine and the working machine because the circulation pump, connection pipings associated therewith and the radiated heat control device are not arranged around them.

(C) In the case that there are provided a plurality of radiators and radiator fans with the respective radiators being arranged in a longitudinal direction and the respective radiator fans being arranged corresponding to the respective radiators in the longitudinal direction, since both the dimensions of the external forms and the heights of the respective radiator fans become smaller in comparison with ones in the case that there is provided only one radiator fan, both the dimension of the width and the dimension of the height of the whole of the engine working machine become smaller by the reduced portions of the above-mentioned dimensions correspondingly.

And since the radiator fan is made small in dimension of its external form, the peripheral speed of its outer end edge can be small and the howl noise caused thereby can be weakened. Accordingly, notwithstanding that the radiator fan is disposed outside the sound-proof casing, the level of noise generated by the engine working machine is remarkably low.

(D) In the case that there are provided two radiators and two radiator fans of axial flow types respectively, the circulation pump is disposed in the middle portion of the upper support frame in a longitudinal direction as well as the radiator fans are mounted on the opposed sides of the circulation pump in a longitudinal direction with facing upward as well as forming air suction spaces below the respective radiator fans, and at least three of four, namely left, right, front and back surrounding lateral side surfaces of the air suction space are provided with the radiator respectively so that the cooling air sucked by the radiator fan can flow upward after passing through the radiator from its exterior to its interior, the radiator can be made low in height with securing a sufficient radiation area as well as the total height of the engine working machinne can be made low by the decreased portion of the radiator height correspondingly.

(E) In the case that the upper support frame is detachably mounted on the upper side of the sound-proof casing, the engine working machine can be manufactured by the connection of both a lower unit and an upper unit which are previously assembled separately as a unit on the sound-proof casing side and as a unit on the upper support frame side respectively. Therefore, the unit on the upper support frame side can be assembled on a low place and the efficiency of assembly work can be enhanced. And the manufacturing costs of the engine working machine can be reduced.

(F) In the case that an opening for use in maintenance is formed substantially all over the upper surface of the sound-proof casing and detachably covered by the upper support frame, since the upper side of the engine and the working machine is made accessible through the maintenance opening by removing the upper support frame from the sound-proof casing at the time of the maintenance for the engine or the working machine, the maintenance from the upper side can be facilitated. And since the engine or the working machine can be lifted up through the maintenance opening, the replacement thereof can be facilitated.

(G) In the case that the radiated heat control device comprises a variable flow dividing valve serving to divide the engine cooling liquid variably to the waste heat recovery heat exchanger and to the radiator, a temperature sensor serving to detect the temperature of the engine cooling liquid and a flow dividing ratio control means serving to controllably actuate the variable flow dividing valve according to the detection signal from the temperature sensor, and the variable flow dividing valve and the circulation pump are arranged side by side each other on the upper support frame, since the engine and the generator are not surrounded by the variable flow dividing valve and the connection pipings associated therewith, the maintenance for them can be carried out more easily.

Other objects, features and advantages of the present invention will be readily apparent from the following description taken in conjunction with the following drawings.

BRIEF DESCRIPTION OF THE DRAWINGS

FIGS. 1 through 13 show a preferred embodiment of the present invention;

DESCRIPTION OF THE PREFERRED EMBODIMENT

A preferred embodiment embodiment of the present invention will now be explained with reference to the drawings.

Figure 1:
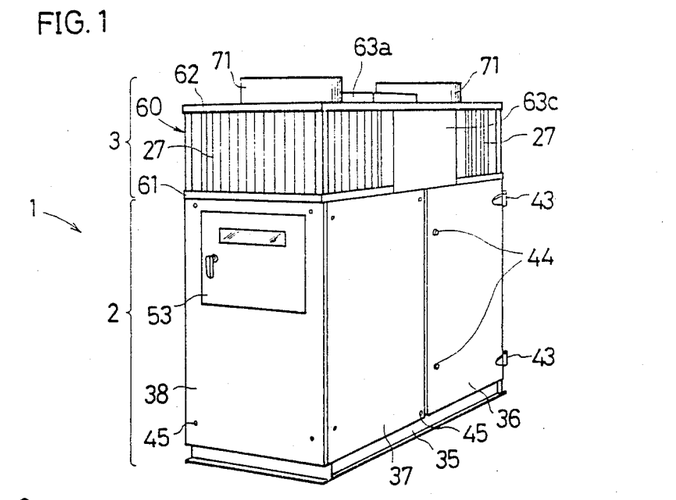
FIG. 1 is a perspective view showing an external appearance of an engine working machine with a waste heat recovery apparatus, constructed as a sound-proof type cogeneration apparatus.

In the perspective view of FIG. 1, a cogeneration apparatus 1 as an engine working machine with a waste heat recovery apparatus comprises an internal combustion engine and an electricity generator (a working machine) both of which are accommodated within a sound-proof casing 2 and an upper unit 3 detachably fixed on the upper side of the sound-proof casing 2. In the case of the generation output of 15 KW, the dimensions of the external form of the cogeneration apparatus 1 are ab. 1800 mm in length, ab. 700 mm in width and ab. 1600 mm in height.

The construction of the cogeneration apparatus 1 will be explained with reference to FIGS. 2 and 3 hereinafter.

Figures 2, 3:
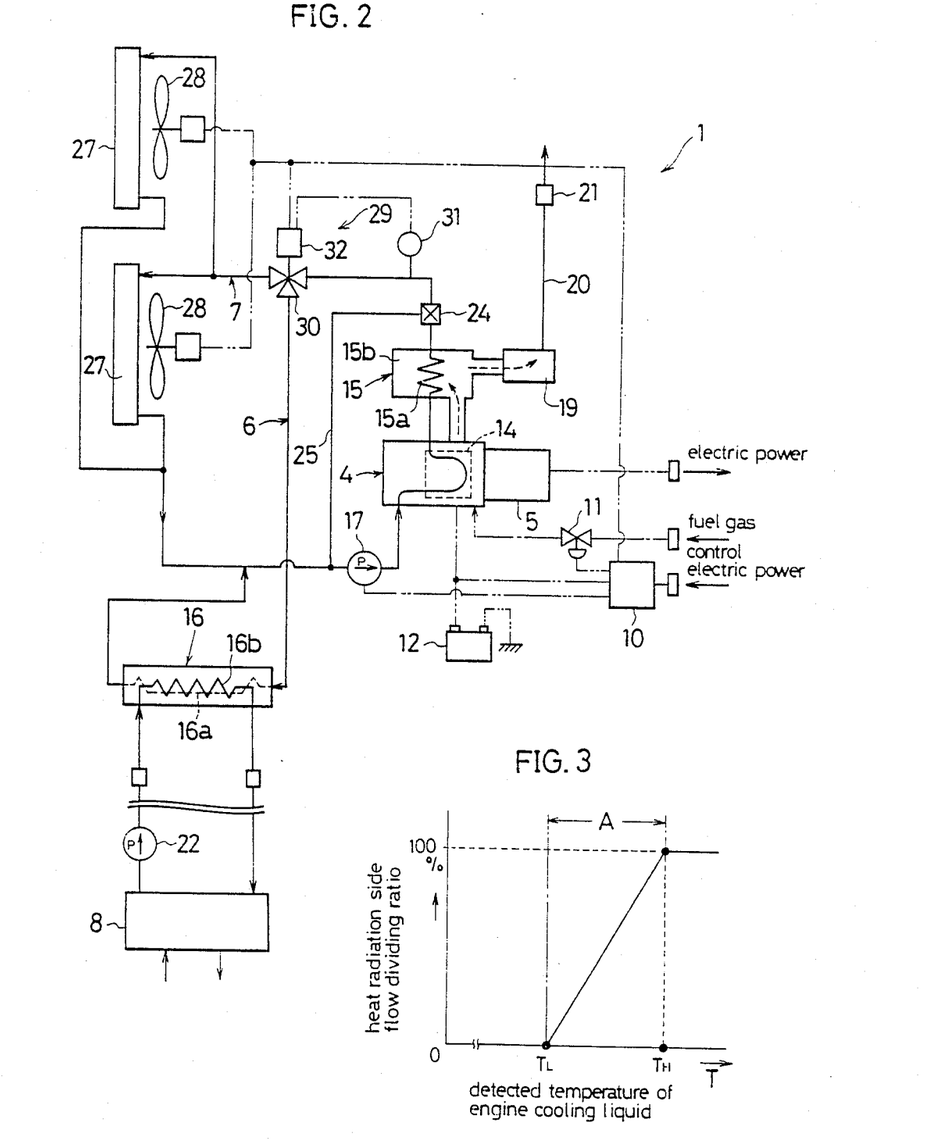
FIG. 2 is a system diagram of the whole of the cogeneration apparatus.
FIG. 3 is a view showing the relation between a detected temperature of an engine cooling liquid and a heat radiation side flow dividing ratio in the variable flow dividing valve.

As shown in a system diagram of FIG. 2, there are provided a liquid-cooled vertical gas engine 4, a generator 5, an engine waste heat recovery circuit 6 and an engine cooling circuit 7. The generator 5 is adapted to be driven by the engine 4 so that the generator 5 operates for the generation of electric power as well as both the heat possessed in the cooling liquid for the engine 4 and the heat possessed in the engine exhaust gas are recovered through the engine waste heat recovery circuit 6 as a hot water to be supplied to a hot water storage tank 8 arranged outside the cogeneration apparatus 1. And when the heat radiated from the engine waste heat recovery circuit 6 gets decreased as the hot water is less consumed from the hot water storage tank 8 and accordingly the temperature of the engine cooling liquid is increased higher than a predetermined temperature, the temperature of the engine cooling liquid is adapted to be kept in a certain range of temperature by the heat radiation of the liquid through the engine cooling circuit 7. Incidentally, the symbol 10 designates an electric control device. The electric control device 10 is adapted to be supplied with a control electric power as an input from its external and to control the operations of the engine 4, the generator 5 and various accessories as well as to open and close a fuel gas supply valve 11 operatively according to the stop and start of the engine 4. The symbol 12 designates a battery.

The above-mentioned engine waste heat recovery circuit 6 is adapted to interconnect an outlet of a water jacket 14 of the engine 4 to an inlet thereof 14 through an engine cooling liquid passage 15a of a heat exchanger 15 for the absorption of exhaust gas heat (referred to as a first heat exchanger 15 hereinafter), an engine cooling liquid passage 16a of a waste heat recovery heat exchanger 16 (referred to as a second heat exchanger 16 hereinafter) and an engine cooling liquid circulation pump 17. The circulation pump 17 is preferably of an electrically driven type and is adapted to be started and stopped by the electric control device 10.

The exhaust gas from the engine 4 is adapted to be discharged from an exhaust gas passage 15b of the first heat exchanger 15 to the outside through a main muffler 19, an exhaust pipe 20 and an auxiliary muffler 21 in order.

The temperature of the engine cooling liquid is raised within the water jacket 14 and further raised by the absorption of exhaust gas heat while the liquid passes through the engine cooling liquid passage 15a of the first heat exchanger 15. Thereafter, the engine cooling liquid transfers its heat to the hot water within a hot water passage 16b while passing through the engine cooling liquid passage 16a of the second heat exchanger 16 and then is returned to the water jacket 14. The circulation of the hot water to the hot water passage 16b is carried out by a hot water circulation pump 22. At the time of cold starting of the engine 4, the engine cooling liquid delivered from the outlet of the water jacket 14 is adapted to be bypassed from a thermostat valve 24 to the inlet of the engine cooling liquid circulation pump 17 through a bypass passage 25. Thereby, the warming up for the engine 4 is facilitated.

The engine cooling circuit 7 is so arranged as to run from the outlet of the water jacket 14 to the inlet thereof through two radiators 27, 27 and the circulation pump 17 in order. Those two radiators 27, 27 are arranged side by side and provided with radiator fans 28 of electrically driven type respectively. The quantity of heat radiated in the radiators 27, 27 are adapted to be controlled by a radiated heat control device 29.

The radiated heat control device 29 comprises a variable flow dividing valve 30 of an electrically driven type, a temperature sensor 31 and a flow dividing ratio control means 32 and serves to connect the engine cooling circuit 7 to the engine waste heat recovery circuit 6 in parallel through the variable flow dividing valve 30 so as to enable the flow dividing variably. The temperature 31 is disposed between the outlet of the water jacket 14 and the variable flow dividing valve 30 so as to detect the temperature of the engine cooling liquid passing through the engine waste heat recovery circuit 6 and is electrically associated with the variable flow dividing valve 30 through the flow dividing ratio control means 32. Thereby, even in the case of a variation of a power generation load for the engine 4 or a waste heat recovery load, it becomes possible to keep the temperature of the engine cooling liquid flowing through the water jacket 14 within a certain range of a temperature.

As shown in FIG. 3, a temperature range A for controlling the heat to be radiated is settled in the temperature sensor 31. The lower limit of the temperature range A is defined at a predetermined radiation start temperature $T_L$ (herein, ab 87° C.) and the upper limit thereof is defined at a predetermined full radiation temperature $T_H$ (herein, ab. 93° C.). Based on a valve of a temperature T of the engine cooling liquid detected by the temperature sensor 31, the flow dividing ratio for two circuits of the engine waste heat recovery circuit 6 and the engine cooling circuit 7 is adapted to be varied through the flow dividing ratio control means 32 and the variable flow dividing valve 30. Thereby, the ratio between the radiated heat in the radiator 27 and the waste heat recovered in the second heat exchanger 16 is adapted to be varied. The radiated heat control device 29 operates as described in following items (1) through (3).

(1) In the case that the detected temperature T is lower than the predetermined temperature $T_L$ (in the case that the temperature of the engine cooling liquid gets decreased abnormally), the variable flow dividing valve 30 is controlled so as to decrease the heat radiation side flow dividing ratio for the radiator 27 of the engine cooling circuit 7 to 0% as well as to increase the waste heat recovery side flow dividing ratio for the second heat exchanger 16 of the engine waste heat recovery circuit 6 to 100%. Thereby, the whole of the engine cooling liquid which has absorbed the waste heat from the engine 4 flows from the variable flow dividing valve 30 to the second heat exchanger 16 so that the engine waste heat can be recovered in a very high ratio.

(2) In the case that the detected temperature T is not below the predetermined temperature $T_L$ as well as not above the predetermined temperature $T_H$ (in the case that the temperature of the engine cooling liquid is within the temperature range A for controlling the heat to be radiated), the variable flow dividing valve 30 is actuated toward the radiated heat increase side as the detected temperature T increases higher so that the heat radiation side flow dividing ratio can be increased as well as the waste heat recovery side flow dividing ratio can be decreased. To the contrary, the variable flow dividing valve 30 is actuated toward the radiated heat decrease side as the detected temperature T decreases lower so that the heat radiation side flow dividing ratio can be decreased as well as the waste heat recovery side flow dividing ratio can be increased.

Thus, when the quantity of the waste heat recovered from the second heat exchanger 16 is decreased or the power generation load for the engine 4 is increased so that the engine waste heat itself increases, the temperature of the engine cooling liquid tends to rise. However, since the temperature sensor 31 detects the temperature rising and controls the variable flow dividing valve 30 through the flow dividing ratio control means 32 so as to shift it 30 toward the heat radiation increase side, the engine cooling liquid is divided to flow more to the side of the engine cooling circuit 7 and to flow less to the side of the engine waste heat recovery circuit 6. Therefore, since the radiated heat of the engine waste heat is increased accordingly, the temperature rising of the engine cooling liquid can be prevented effectively.

On the contrary, when the quantity of heat recovered from the second heat exchanger 16 is increased or the the power generation load for the engine 4 is decreased so that engine waste heat itself decreases, the temperature of the engine cooling liquid tends to lower. However, since the temperature sensor 31 detects the temperature lowering and controls the variable flow dividing valve 30 through the flow dividing ratio control means 32 so as to shift it 30 toward the radiated heat decrease side, the engine cooling liqid is divided to flow less to the engine cooling circuit 7 and to flow more to the engine waste heat recovery circuit 6. Therefore, since the radiated heat of the engine waste heat is decreased accordingly, the temperature lowering of the engine cooling liquid can be prevented effectively.

As noted above, since the temperature of the engine cooling liquid can be kept in a certain range of temperature by means of the flow dividing function of the variable flow dividing valve 30, the engine 4 can be prevented from overheating as well as the first heat exchanger 15 can be prevented from being thermally damaged by an abrupt change of temperature.

Since the temperature of the engine cooling liquid can be kept within a certain range of temperature, the variable extent of the temperature of the hot water which flows out of the hot water passage 16b of the second heat exchanger 16 becomes small and the temperature of the hot water to be supplied can be kept in a predetermined range of temperature.

(3) In the case that the detected temperature T is higher than the predetermined temperature $T_H$ (in the case that the temperature of the engine cooling liquid 5 gets increased abnormally), the variable flow dividing valve 30 is controlled so as to increase the heat radiation side flow dividing ratio for the radiator 27 of the engine cooling circuit 7 to 100% as well as to decrease the waste heat recovery side flow dividing ratio for the second heat exchanger 16 of the engine waste heat recovery circuit 6 to 0%. Thereby, the whole of the the engine cooling liquid is supplied from the variable flow dividing valve 30 to the radiator 27 so that the temperature of the engine cooling liquid can lower rapidly and the engine 4 can be prevented from overheating effectively.

When the variation of the load in the cogeneration apparatus 1 is large, it is apprehended that the variable flow dividing valve 30 is brought into a hunting condition. That is, in the case that the thermal load in the hot water storage tank 8 gets decreased abruptly while the cogeneration apparatus 1 operates within the temperature range A for controlling the heat to be radiated, the radiated heat in the second heat exchanger 16 gets reduced abruptly and the temperature of the engine cooling liquid gets raised abruptly higher than the predetermined temperature $T_H$. This condition is detected by the temperature sensor 31 and the heat radiation side flow dividing ratio of the variable flow dividing valve 30 is changed over to 100% so that the whole of the engine cooling liquid can flow to the radiator 27 and then the engine cooling liquid can be cooled down abruptly. Thereupon, the abrupt lowering of the temperature is detected by the temperature sensor 31 and the heat radiation side flow dividing ratio of the variable flow dividing valve 30 is made small. If the radiated heat is still insufficient under that condition, the heat radiation side flow dividing ratio of the variable flow dividing valve 30 is changed over again to 100%. Due to the repetition of the above-mentioned procedure, the hunting is caused. Also in the case that the thermal load in the hot water storage tank 8 gets increased abruptly or the power generation load for the engine 4 is varied abruptly, similarly the hunting is caused.

In order to prevent such hunting, the speed for adjusting the flow dividing ratio of the variable flow dividing valve 30 may be controlled gently and the adjusting curve for the heat radiation side flow dividing ratio within the temperature range A for controlling the heat to be radiated may be suitably selected in accordance to the degree of the load variation.

In the case that the heat radiation side flow dividing ratio of the variable flow dividing valve 30 is kept in a small state at the time of the stop of the engine 4, it is apprehended that the engine 4 is overheated due to a small quantity of heat radiated in the radiator 27 at the time of the restarting of the engine 4. For the countermeasure, an operation for stopping the engine 4 may be detected by means of an engine stop detection means (for example, an engine revolution sensor, a sensor for the amount of throttle valve opening and so on) just before the stop of the engine 4 and the heat radiation side flow dividing ratio of the variable flow dividing valve 30 may be controlled previously so as to be shifted toward 100% basing on the detection signal. Thereby, at the time of the restarting of the engine 4, the heat can be always radiated sufficiently in the radiator 27 and the engine 4 can be prevented from overheating.

The temperature sensor 31 may be located in the water jacket 14 or in the engine cooling liquid passage 15a of the first heat exchanger 15. But if the temperature of the hot water to be supplied from the second heat exchanger 16 is to be kept within a predetermined extent of temperature it is preferable to locate the temperature sensor 31 between the water jacket 14 and the variable flow dividing valve 30 as mentioned above.

Next, the concrete construction of the above-mentioned cogeneration apparatus 1 will be explained with reference to FIG. 1 and FIGS. 4 through 12 hereinafter. By the way, the front and back, the left and right and the upper and lower in the arrangement of component members to be described hereinafter will be explained with reference to FIG. 4 as a front view.

As shown in FIG. 1 and FIGS. 4 through 6, the sound-proof casing 2 is provided with a base 35 on which a framework is mounted, a maintenance door 36 which covers the right half of the front surface thereof 2, a front panel 37 which covers the left half of the front surface, side panels 38, 39 which cover the opposed left and right side surfaces thereof 2 respectively and back panels 40, 41 which cover the left and right portions of the back surface thereof 2. The maintenance door 36 is pivotably supported by the right side panel 39 through hinges 43, 43 and adapted to be manipulatively opened and closed by means of opening and closing manipulation means 44, 44. And the other respective panels 37 through 41 are detachably fixed onto the framework members by means of a plurality of bolts 45. By the way, a maintenance opening is formed all over the upper surface of the sound-proof casing 2.

Within the sound-proof casing 2, there are provided the vertical engine 4 on the right side and the generator 5 on the left side, both of which are connected interlockingly through a coupling. The second heat exchanger 16 is disposed in the back lower portion of the crankcase 47 of the engine 4 and the first heat exchanger 15 is disposed on the back side of the cylinder head 48. And the main muffler 19 is disposed on the underside of the first heat exchanger 15. The air cleaner 49 is disposed on the upper side of the cylinder head 48. Further, the battery 12 is disposed on the upper side of the generator 5. The electric control device 10 is provided with an electric power source panel 50 arranged so as to face the right side panel 39 and a control panel 51 arranged so as to face the left side panel 38. Since both panels 50, 51 are spaced apart each other, an electronic control type controller within the control panel 51 is prevented from operating erroneously due to electric noises from the electric power source panel 50. In the left side panel 38, there is provided a door 53 (refer to FIG. 1) with facing the control panel 51. One back panel 41 is provided with a ventilating inlet 54 and the right side panel 39 is provided with a ventilating outlet 55 respectively. A ventilating fan 56 is disposed on the right side of the crankcase 47 so as to be driven by the engine 4.

Figure 4:
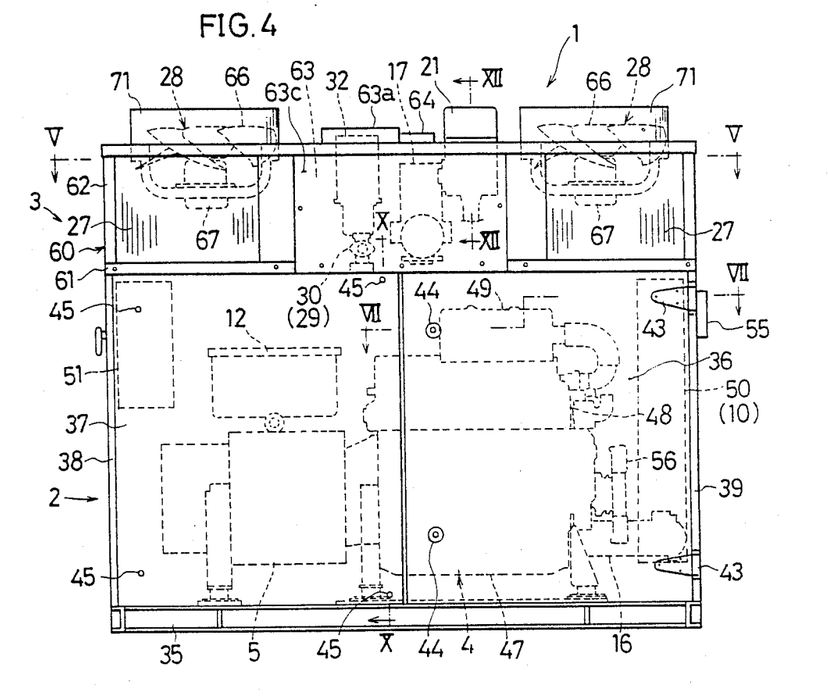
FIG. 4 is a front view of the cogeneration apparatus.
Figure 5:
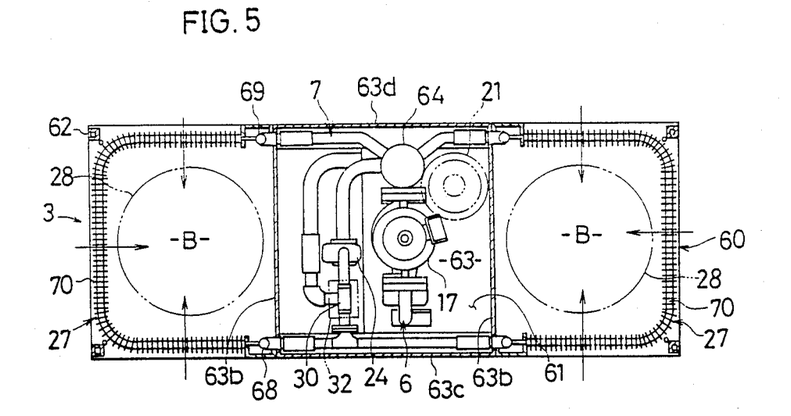
FIG. 5 is a sectional view on the V—V arrow line in FIG. 4.
Figure 6:
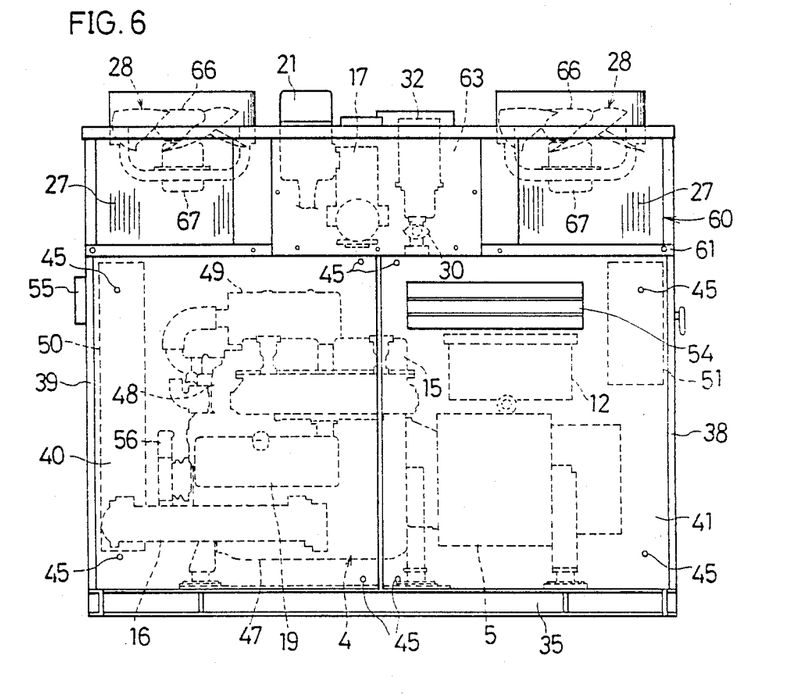
FIG. 6 is a back view of the cogeneration apparatus.

An upper support frame 60 for the upper unit 3 is detachably fixed on the upper side of the sound-proof casing 2. The upper support frame 60 comprises a framework assembled in a rectangular prism configuration with square pipes 62 on a lower water collection receptacle 61. A pump room 63 is formed separately in the middle portion of the upper support frame 60 in a left and right direction and is provided at its central position with the circulation pump 17. On the left side of the circulation pump 17, there are provided the thermostat valve 24, the variable flow dividing valve 30 and the flow dividing ratio control means 32. On the back side of the circulation pump 17, there are provided the auxiliary muffler 21 which passes through the upper cover plate 63a and a cooling liquid supplement port 64. The upper cover plate 63a is arranged in an upward projecting manner above the variable flow dividing valve 30 and the cooling liquid supplement port 64.

On the opposed left and right sides of the pump room 63, there are provided axial flow type radiator fans 28, 28. A fan body 66 of each radiator fan 28 is supported in an upward facing manner by the upper portion of the upper support frame 60 through an electric motor 67. Below the fan body 66, there is provided an air suction space B. Three lateral side surfaces of the four lateral side, namely left, right, front and back side surfaces of the air suction space B except a side plate 63b of the pump room 63 are covered by the radiator 27. The radiator 27 comprises an inlet side header 68, an outlet side header 69 and a great number of radiation pipes 70 which communicate to both headers 68, 69. These radiation pipes 70 have U-like shapes in plan view being provided on their external surfaces with fins and are stacked vertically. When the radiator fan 28 is operated, the cooling air is so sucked as to pass by the radiation pipes 70 of the radiator 27 transversely from the outside into the inside and then to flow upward and is discharged through an air discharge hood 71. Both the front and the back of the pump room 63 are covered with a front side plate 63c and a back side plate 63d respectively.

Figure 7:
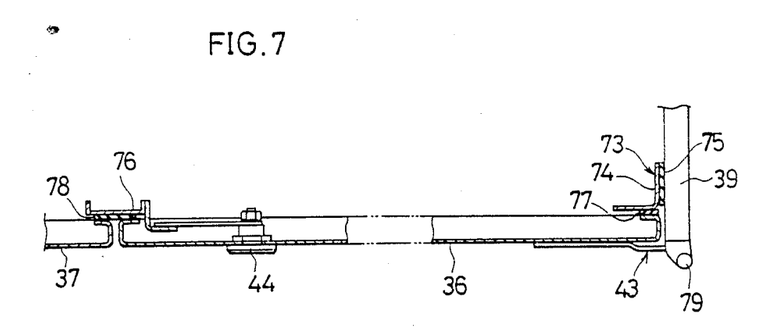
FIG. 7 is a sectional view on the VII—VII arrow line in FIG. 4.

A construction for mounting the maintenance door 36 will be explained in detail with reference to FIG. 7. That is, the right side panel 39 is fixedly secured by means of bolts through a rubber packing 75 onto a right side angle pillar 74 which is a portion of a framework member 73. The door 36 is supported pivotably by the front portion of the right side panel 39 through the hinges 43 so as to be opened and closed and is adapted to be engaged with a center pillar 76 through upper and lower two opening and closing manipulation means 44 in its closed condition. Under such a closed condition, there are provided rubber packings 77, 78 between the door 36 and the right side pillar 74 as well as between the door 36 and the center pillar 76 respectively. Thereupon, the hinge pin 79 of the hinge 43 is located at such a position as to be in front of the front surface of the door 36 as well as on the right side of the right end surface of the door 36. Thereby, when the door 36 is manipulatively opened and closed, the right edge portion of the packing pressing surfaces of the door 36 can be prevented from interfering with the front surface of the right side packing 77. Accordingly, the door 36 can be opened and closed smoothly as well as the soundproof capability can be prevented from being degraded by a damage of the packing 77. In spite of being not illustrated, the above-mentioned center pillar 76 is adapted to be detachably fixed by means of bolts at its upper and lower opposed ends to the base 35 and to the water collection receptacle 61 respectively so as to be removed as occasion demands for the maintenances of the engine 4 and the generator 5.

Figure 8:
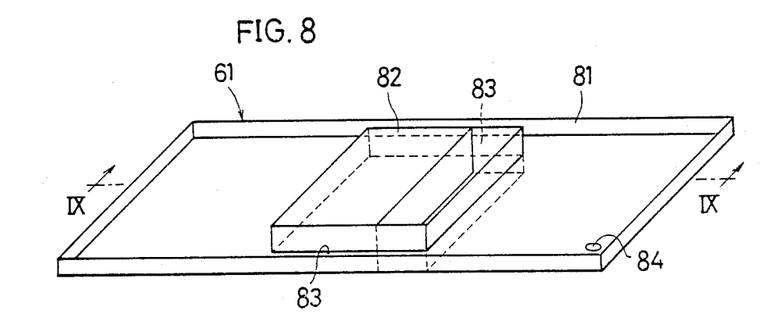
FIG. 8 is a perspective view of a water collection receptacle disposed in the lower portion of the upper support frame.
Figure 9:
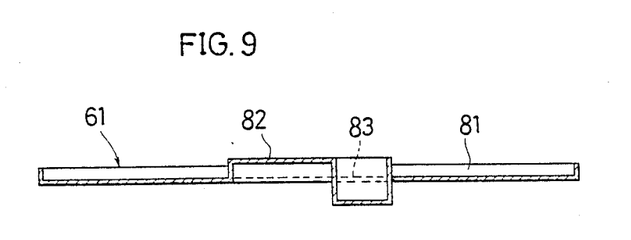
FIG. 9 is a sectional view on the IX—IX arrow line in FIG. 8.

A construction of the water collection receptacle 61 will now be explained in detail with reference to FIGS. 8 and 9. That is, the water collection receptacle 61 is formed like a tray by erecting its peripheral portion 81 as a coaming and is provided at its central portion with a support platform 82 formed like a high step so as to support the circulation pump 17. Between the support platform 82 and the peripheral portion 81, there are provided water channels 83, 83 respectively. Thereby, it is enough to provide only one drain hole 84 for the water collection receptacle 61. By the way, the support platform 82 is higher than the upper edge of the peripheral portion 81. Accordingly, in case that the water collection receptacle 61 is filled up with a water occasionally due to any accident, the circulation pump 17 and other electric devices can be prevented from being immersed in the water.

Figure 10:
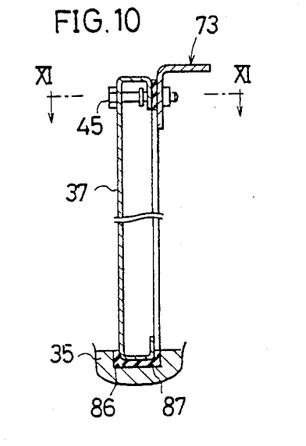
FIG. 10 is a sectional view on the X—X arrow line in FIG. 4.
Figure 11:
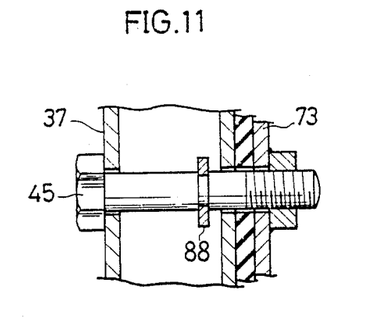
FIG. 11 is an enlarged sectional view on XI—XI arrow line in FIG. 10.

Further, constructions of the mounting portions for the respective panels 37 through 41 will be explained basing on the typically illustrated example of the front panel 37 with reference to FIGS. 10 and 11. The front panel 37 is inserted at its lower end portion through a packing 87 into a fitting groove 86 formed in the base 35 as well as fixedly secured onto the framework member 73 of the sound-proof casing 2 by means of a plurality of bolts 45. A stopper ring 88 is fixedly secured to the foot portion of each bolt 45 so as to abut against the inner surface of the front panel 37. Thereby, at the time of the removal of the front panel 37, the bolts 45 can be prevented from being lost because they are adapted to be remained in the front panel 37 after their disengagement from the framework member 73.

Figure 12:
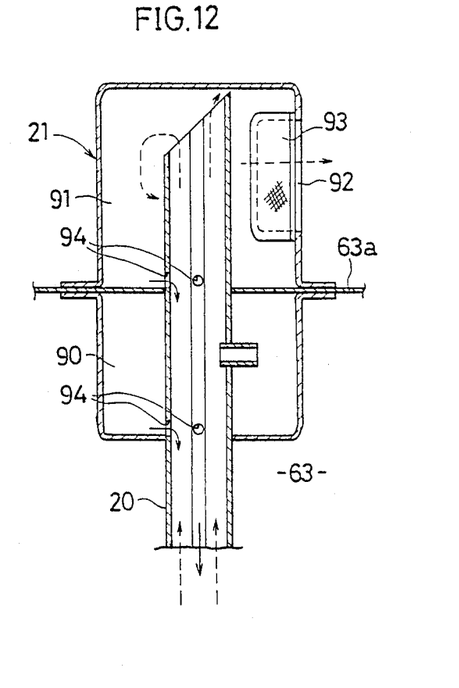
FIG. 12 is an enlarged sectional view on the XII—XII arrow line in FIG. 4.

Then, a construction of the auxiliary muffler 21 will be explained in detail with reference to FIG. 12. This auxiliary muffler 21 comprises a first resonance chamber 90 arranged on the lower side of the upper cover plate 63a for the pump room 63 and a second resonance chamber 91 arranged on the upper side of the upper cover plate 63a, which both chambers 90, 91 surround the upper portion of the exhaust pipe 20 which passes through the upper cover plate 63a. The symbol 92 designates an exhaust port, and the symbol 93 designates an punched metal plate. The exhaust pipe 20 is provided with drain holes 94 which are in communication with the respective lowermost portions of the first resonance chamber 90 and the second resonance chamber 91. Accordingly, even though liquid is produced by the condensation of the exhaust gas within the respective resonance chambers 90, 91, the auxiliary muffler 21 can be prevented from being corroded because the condensed liquid is adapted to returned smoothly to the exhaust pipe 20 through the drain holes 94 as indicated by the solid arrow lines.

Figure 13:
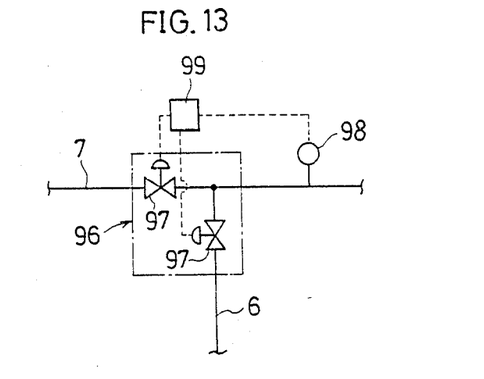
FIG. 13 is a partial system diagram showing an example of the variable flow dividing valve.

FIG. 13 shows one example of the variable flow dividing valve. The variable flow dividing valve 96 comprises two regulation valves 97, 97 disposed in the respective circuits 6, 7 instead of the above-mentioned three-way valve. The amounts of valve opening for both regulation valves 97, 97 are adapted to be adjustably operated by the flow dividing ratio control means 99 basing on the detection signal from the temperature sensor 98.

It is, however, possible to modify the above-mentioned embodiment as follows.

The engine cooling circuit 7 may be constructed by simply connecting at least the water jacket 14 of the engine 4, the radiator 27 and the engine cooling liquid circulation pump 17 in a circulating manner, and furthermore the radiator 27 may be arranged in series with respect to the second heat exchanger 16.

The radiated heat control device 29 for the radiator 27 may be so constructed as to control the quantity of cooling air delivered by the radiator fan 28, instead of the one provided with the variable flow dividing valve. Further, instead of two, one or more than two radiators 27 and radiator fans 28 may be arranged. And the radiator 28 may have such a construction as to cover substantially the whole of the four lateral sides of the air suction space B.

Further, the engine working machine may be so assembled that a compressor, an electric welder and the like are driven by an engine, instead of the cogeneration apparatus.

Still other objects and advantages of the present invention will become readily apparent to those skilled in this art from the preceding detailed description, wherein only the preferred embodiments of the invention are illustrated and described, as aforementioned, simply by way of presenting the best modes contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive, the invention being defined solely by the claims appended hereto.

What is claimed:

1. A sound-proof type engine working machine system with a waste heat recovery apparatus, comprising:
   a sound-proof casing with an upper support frame fixedly secured on the upper side of the sound-proof casing;
   an internal combustion engine connected to a working machine horizontally arranged side by side with respect to each other within the sound-proof casing in a longitudinal direction thereof;
   an engine waste heat recovery circuit, comprising a water jacket of the internal combustion engine, a heat exchanger for the absorption of exhaust gas heat, a waste heat recovery heat exchanger and an engine cooling liquid circulation pump which are interconnected in a cooling liquid circulating manner;
   an engine cooling circuit, comprising at least the water jacket, the radiator and the circulation pump which are interconnected in a cooling liquid circulating manner;
   a radiated heat control device for controlling a rate at which heat is radiated from said radiator; and
   a radiator fan;
   wherein said radiator and radiator fan are disposed on the upper support frame, with said radiator fan arranged in correspondence with the radiator, the radiators and the fans being located in corresponding suction spaces, each suction space having openings on three vertical sides to allow flow of sucked air therethrough, the sucked air passing through the radiators which have a generally U-shape to receive the sucked air flow from the openings in the three vertical sides, the radiator fans being disposed above the suction spaces in corresponding hoods.

2. A sound-proof type engine working machine with a waste heat recovery apparatus as recited in claim 1, wherein:
   the circulation pump and the radiated heat control device are provided in a pump room located between the two suction spaces formed to be within and longitudinally disposed with respect to the upper support frame, there being provided a radiator and a fan in each of said suction spaces.

3. A sound-proof type engine working machine system with a waste heat recovery apparatus as recited in claim 1, wherein:
   there are provided a plurality of radiators and respective radiator fans,
   said plurality of radiators are arranged in a longitudinal direction of the sound-proof casing, and
   said plurality of radiator fans are arranged correspondingly to the respective radiators in a longitudinal direction thereof.

4. A sound-proof type engine working machine system with a waste heat recovery apparatus as recited in claim 3, wherein:
   there are provided two radiators and two radiator fans respectively, and said each radiator fan is of an axial flow type,
   the circulation pump is provided in the middle portion of the upper support frame in a longitudinal direction thereof,
   the radiator fans are disposed facing upward on the opposed sides of the circulation pump in the longitudinal direction, and there is provided an air suction space below each radiator fan,
   at least three lateral side surfaces of four side surfaces of the air suction space are covered by the radiator, and
   the cooling air is sucked by the radiator fan so as to pass by the radiator transversely from the outside of the system into the inside and then to flow upward.

5. A sound-proof type engine working machine system with a waste heat recovery apparatus as recited in claim 4, wherein:
   the lateral side surfaces of the air suction space, except for the one facing the circulation pump, are covered by the radiator.

6. A sound-proof type engine working machine with a waste heat recovery apparatus as recited in claim 1, wherein:
   the upper support frame is detachably fixed onto an upper side of the sound-proof casing.

7. A sound-proof type engine working machine with a waste heat recovery apparatus as recited in claim 6, wherein:
   a maintenance opening is formed substantially over the entire upper side of the sound-proof casing and is covered by the upper support frame.

8. A sound-proof type engine working machine with a waste heat recovery apparatus as recited in claim 6, wherein;
   the upper support frame is provided with a water collection receptacle.

9. A sound-proof type engine working machine system with a waste heat recovery apparatus, comprising:
   a sound-proof casing with an upper support frame fixedly secured on the upper side of the sound-proof casing;
   an internal combustion engine connected to a working machine, horizontally arranged side by side with respect to each other within the sound-proof casing in a longitudinal direction thereof;
   an engine waste heat recovery circuit, comprising a water jacket of the internal combustion engine, a heat exchanger for the absorption of exhaust gas heat, a waste heat recovery heat exchanger and an engine cooling liquid circulation pump interconnected in a cooling liquid circulating manner;

an engine cooling circuit, comprising at least the water jacket, the radiator and the circulation pump interconnected in a cooling liquid circulating manner; and a radiated heat control device for controlling a rate at which heat is radiated from said radiator; wherein said radiator and a radiator fan are disposed on the upper support frame, with said radiator fan arranged in correspondence with the radiator, the radiated heat control device comprises a variable flow dividing valve, a temperature sensor and a flow dividing ratio control means, the engine cooling circuit is arranged in parallel with respect to the engine waste heat recovery circuit through the variable flow dividing valve so as to enable the flow to be divided variably, the temperature sensor is disposed in the engine waste heat recovery circuit, and is associated with the variable flow dividing valve through the flow dividing ratio control means, and the temperature sensor serves to detect the temperature of the engine cooling liquid passing through the engine waste heat recovery circuit, such that when the detected temperature of the liquid is within a temperature range for controlling the heat to be radiated, namely between a predetermined radiation start temperature and a higher predetermined full radiation temperature, as the detected temperature of the liquid increases the flow dividing ratio control means actuates the variable flow dividing valve toward a radiated heat increase side so that a heat radiation side flow dividing ratio for the engine cooling liquid from the engine waste heat recovery circuit to the engine cooling circuit is increased and a waste heat recovery side flow dividing ratio for the engine cooling liquid to the engine waste heat recovery circuit is decreased and, as the detected temperature of the liquid decreases the flow dividing ratio control means actuates the variable flow dividing valve toward a radiated heat decrease side so that the heat radiation side flow dividing ratio is decreased and the waste heat recovery side flow dividing ratio is increased.

10. A sound-proof type engine working machine with a waste heat recovery apparatus as recited in claim 9, wherein:

the variable flow dividing valve is arranged side by side relative to the circulation pump on the upper support frame.

* * * * *